G. J. BRAGG.
CENTRIFUGAL LIQUID SEPARATOR.
APPLICATION FILED DEC. 5, 1907.
901,149.
Patented Oct. 13, 1908.
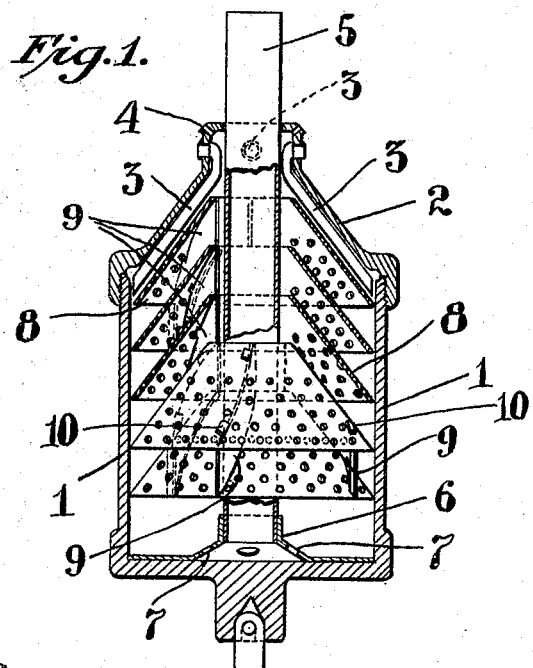
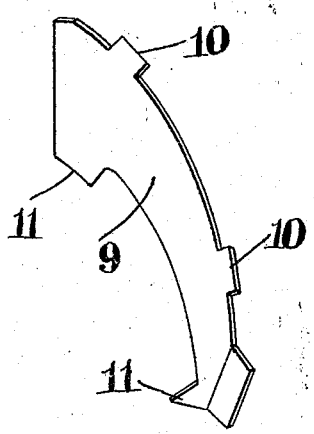
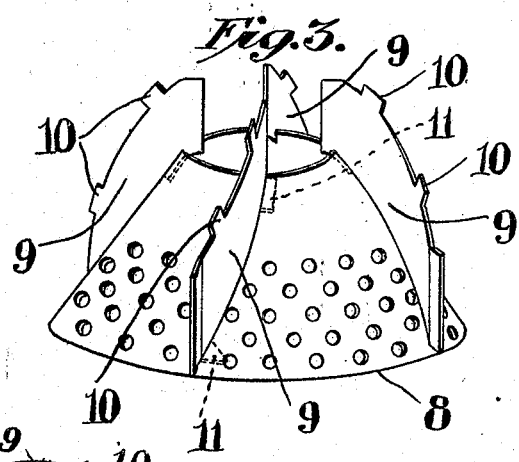
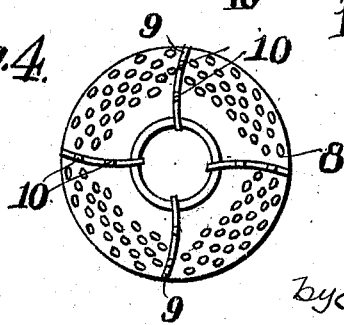
Attest:
Inventor:
George J. Bragg.

UNITED STATES PATENT OFFICE.

GEORGE J. BRAGG, OF PHILADELPHIA, PENNSYLVANIA.

CENTRIFUGAL LIQUID-SEPARATOR.

No. 901,149.  Specification of Letters Patent.  Patented Oct. 13, 1908.

Application filed December 5, 1907. Serial No. 405,186.

*To all whom it may concern:*

Be it known that I, GEORGE J. BRAGG, a citizen of the United States, residing at Philadelphia, in the county of Philadelphia and State of Pennsylvania, have invented certain new and useful Improvements in Centrifugal Liquid-Separators; and I do hereby declare the following to be a full, clear, and exact description of the same, such as will enable others skilled in the art to which it appertains to make and use the same.

My invention relates to improvements in centrifugal liquid separators, and particularly to the class thereof known as cream separators and used particularly in the separation of cream from whole milk; and my invention comprises improvements in the "skimming" or cream-collecting devices of such separators.

My invention consists in the novel features of construction hereinafter described and particularly pointed out in the claims.

The object of my invention is to improve and simplify the construction of such skimming devices, and to improve the efficiency thereof.

I will now proceed to describe my invention with reference to the accompanying drawings, in which one embodiment of my invention is illustrated, and will then point out the novel features in claims.

In said drawings: Figure 1 shows a central vertical section of a cream separator bowl and of my improved skimming device therein. Fig. 2 shows in perspective one of the so-called "wings" which, according to my invention, separate the cones one from another and at the same time serve to unite the cones into a unitary structure. Fig. 3 shows a perspective view of one of said cones, with the wings thereon. Fig. 4 is a plan view, looking down upon the vanes mounted upon one of the coned elements.

In said drawings, 1 designates a cream separator bowl, which may be of any suitable or usual construction, 2 the cover thereof, 3 the skim milk tubes, 4 the cream outlet, and 5 the central feed tube, provided with a flange 6 at its lower end. These parts may all be of customary construction. The flange of the feed tube has, near its junction with said feed tube, openings 7 by which the whole milk is permitted to pass into the main portion of the interior of the bowl. Within this main portion of the interior of the bowl, and surrounding the feed tube, are a number of cone-shaped or upwardly-tapering objects 8, termed hereinafter "cones". At their lower edges these cones fit the inner wall of the bowl closely, so as not to be loose in the bowl.

The cones are truncated, as shown, their upper apertures being somewhat larger than the external diameter of the feed tube, thus leaving a space for the up-flow of the cream. Said cones are spaced apart the proper distance, and at the same time held together so that the cones constitute a unitary structure, by blades or wings 9, one of which is shown by itself in Fig. 2. Said wings may be secured to the cones in any suitable manner. One convenient method of so securing them, illustrated in the drawings, comprises providing each wing with lugs 10 adapted to be inserted through corresponding slots of the cone next above and then bent over, and also providing each wing with other lugs 11 adapted to be inserted through corresponding slots in the cone next below and then bent over. The said wings, besides spacing the cones apart and holding them together, also act as vanes to keep the liquid in the bowl rotating at, as nearly as possible, the speed of the bowl; in other words, said wings tend to reduce to a very low limit slip of the liquid with reference to the bowl, thereby increasing both the efficiency, and the capacity, for a given size and speed of rotation, of the separator, and at the same time avoiding any tendency to churning of the milk. The wings are preferably helically-curved, as shown, that the liquid may leave the wings easily, and their surfaces cross radial lines of the bowl so that separation is promoted.

The cones are preferably perforated for about half of their height, as shown, ample opportunity being thus provided for the passage of the liquid upward through the bowl. The surfaces of the cones act as cream collecting surfaces, the particles of butter-fat collecting on such surfaces and then moving inward toward the center.

What I claim is:—

1. A skimming device for separators, comprising a plurality of upwardly-tapering bodies, open at the top, and secured together and spaced apart by curved wings constituting vanes to reduce slip between liquid and the rotating skimming device.

2. A skimming device for separators, comprising a plurality of upwardly-tapering bodies, open at the top, and curved wings between adjacent bodies spacing said bodies apart and connecting them so as to make a unitary structure, said wings constituting vanes to reduce slip between liquid and the rotating skimming device.

3. A skimming device for separators, comprising a plurality of upwardly-tapering bodies, open at the top, and wings between adjacent bodies spacing said bodies apart and provided with lugs interlocked with said adjacent bodies and so fastening them together into a unitary structure.

4. A skimming device for separators, comprising a plurality of upwardly-tapering conical bodies, open at the top, and curved vanes between and securing adjacent bodies together and arranged to rotate therewith to reduce slip between liquid and the rotating skimming device.

5. In a separator, the combination, with a rotatable bowl, of a skimming device therefor comprising a plurality of cones within said bowl and at the bottom of each cone fitting closely to the sides of said bowl, said cones being perforated, and curved vanes between and securing together said cones and arranged to rotate therewith and thereby to reduce slip of the liquid.

6. A skimming device for separators comprising an open topped conical division plate provided with curved vanes mounted thereon, said vanes having a generally radial direction but crossing radial lines of said division plate.

7. In a separator, the combination with the bowl of a plurality of open topped conical division plates, adjacent plates being spaced apart by curved vanes therebetween, said vanes having a generally radial direction but crossing radial lines of said plates.

In testimony whereof I affix my signature, in the presence of two witnesses.

GEORGE J. BRAGG.

Witnesses:
J. K. WARD,
Mrs. F. M. DAVENPORT.